United States Patent Office 2,870,224
Patented Jan. 20, 1959

2,870,224
PRODUCTION OF 1,1-DIFLUORO-1,2,2-TRICHLOROETHANE

Otto Scherer, Frankfurt am Main, Germany, assignor to Farbwerke Hoechst Aktiengesellschaft vormals Meister & Brüning, Frankfurt am Main, Germany, a corporation of Germany No Drawing. Application June 5, 1956
Serial No. 589,381

5 Claims. (Cl. 260—653.7)

This invention relates to the preparation of 1,1-difluoro-1,2,2-trichlorethane.

The fluorination of pentachlorethane with hydrogen fluoride and antimony catalyst at 140–150° C. and at the corresponding vapor pressure has been described, with the use of two parts of pentachloroethane and a mixture of eight parts of antimony pentachloride and two parts of antimony trichloride. This yields a mixture of fluorination products which, among others, contains tetrafluoro-dichloroethane and trichlorotrifluoroethane.

It has furthermore been noted that pentachloroethane and hydrogen fluoride in the presence of antimony pentachloride as a catalyst and at a reaction temperature between 107 and 118° C. produce a maximum yield of 24% of difluorotrichloroethane.

However, these two processes are of no technical significance because of their low yields and the large amounts of catalyst required.

Still further, it has been described in French Patent 1,069,872 to produce monofluorotetrachloroethanes by reacting pentachloroethane with hydrogen fluoride in the liquid phase in the presence of a catalyst consisting of equal parts of antimony pentachloride and antimony trifluoride, the reaction being performed at a temperature of up to 240° C. If the temperature is increased by a further 20° C., the monofluorotetrachloroethane can be converted to difluorotrichloroethane. It is therefore readily understood that in the process referred to above a temperature below 240° C. is insufficient to produce difluorotrichloroethane. The pentachloroethane is therefore reacted at a temperature of 200–265° C. and at a pressure of 110 atmospheres, the second fluorine atom entering into the molecule only at a temperature above 240° C. When operating according to this method, the vapour phase is cooled to a temperature of below 140° C. However, this process can be performed industrially only with difficulty owing to the relatively high temperatures and pressures applied and considering the long reaction time.

It is an object of this invention to provide a process for preparing 1,1-difluoro-1,2,2-trichloroethane in high yields and with good selectivity to principal product.

Various other objects and advantages of the present invention will become apparent to those skilled in the art on reading the accompanying description and disclosure.

It has been discovered that difluorotrichloroethane can be obtained in very good yields and practically without any by-products, by treating pentachloroethane with hydrogen fluoride, preferably in at least small excess quantities over the amounts required by the theory, in the presence of an antimony halide such as antimony trichloride and antimony trifluoride and mixtures thereof, and chlorine under pressure at a temperature between 110 and 140° C., and by removing the hydrogen chloride formed by passage through a condenser in such a manner that, in relation to the hydrogen chloride, practically no hydrogen fluoride is entrained. The reaction can be carried out at still higher temperatures without, however, obtaining any additional advantages. The degree of the resulting pressure which is mainly due to the pressure of hydrogen chloride, depends on the temperature of the cooling medium. It amounts, for instance, to about 40 atmospheres at a temperature of 20° C. and to about 35 atmospheres at a cooling temperature of 10° C.

When using antimony trichloride as a starting material, the use of an excess of hydrogen fluoride sufficient for the formation of antimony trifluoride is recommended. Moreover, the use of a slight excess of hydrogen fluoride corresponding to the quantity which escapes with hydrogen chloride is also advisable.

One preferably proceeds by first charging the reaction vessel with a small quantity of antimony trifluoride, e. g. one-tenth of the amount by weight of pentachloroethane. To this charge some chlorine is added, e. g., 1–2%, with reference to the weight of the pentachloroethane used. With such small, or even smaller, quantities of chlorine, there is but slight formation of 1,2-difluoro-tetrachloroethane, the formation of which is, of itself, favored by the addition of chlorine and the more so, the more chlorine that is added. The amount of chlorine added, therefore, expediently lies between about 0.5 and 5% and preferably between 1 and 2%.

Fluorination is now carried out in the manner described above. In the following charges the same amount of chlorine is added each time. The initially employed catalyst retains its effectiveness for a large number of charges.

In this method of operation difluorotrichloroethane is obtained in very good yields.

As compared with the known process described in French Patent 1,069,872, the process of this invention is performed using a catalyst consisting of antimony trichloride and/or antimony trifluoride to which are added small amounts of chlorine. It has been found, and this being surprising, that even in the presence of a quantity of chlorine theoretically sufficient to convert about half of the antimony trihalide into antimony pentahalide, that is to form a mixture as used in the examples disclosed in the aforesaid patent, difluorotrichloroethane is produced in an excellent yield already at temperatures between about 110–140° C., that is at a temperature which is by more than 100° C. below that indicated in the cited patent. Contrary to expectation the mixture of antimony trihalides and chlorine reacts in the present case differently than antimony pentahalide.

Example 1

5 parts by weight of antimony trichloride
25 parts by weight of pentachloroethane
6 parts by weight of hydrogen fluoride, and
0.8 parts by weight of chlorine are heated in a pressure vessel of 30 liters capacity for 2 hours to 120–130° C.

With a cooling temperature of 20° C., a pressure of about 40 atmospheres is obtained. The hydrogen chloride formed is removed through an expansion valve within 8-10 hours; the pressure at first remains constant and toward the end of the reaction drops to atmospheric pressure. We obtain:

82.0% of the theory difluortrichloroethane
5.0% of the theory trichloro-dichloroethane
6.0% of the theory monofluoro-tetrachloroethane
3.5% of the theory 1,2-difluoro-tetrachloroethane

Example 2

To the antimony catalyst described in Example 1, are added:

25 parts by weight of pentachloroethane
5.5 parts by weight of hydrogen fluoride, and
0.3 part by weight of chlorine and the mixture is fluorinated as described under 1. The yield of difluorotrichloroethane amounts to 92% of the theory. The catalyst can be employed for a large number of additional charges without losing its effectiveness.

Example 3

When antimony trichloride is replaced by a corresponding amount of antimony trifluoride under equal conditions one obtains identical yields of difluorotrichloroethane.

Various modifications and alterations of the process of this invention will be apparent to those skilled in the art and may be used without departing from the scope of this invention.

Having thus described the invention, I claim:

1. A process for the production of 1,1-difluoro-1,2,2-trichloroethane which comprises reacting hydrogen fluoride with pentachloroethane in the presence of between about 0.5 and about 5 weight percent of chlorine based on the weight of pentachloroethane and an antimony halide, said halide being selected from the group consisting of fluorine and chlorine, at a temperature above 110° C., venting the hydrogen chloride formed during the reaction and recovering 1,1-difluoro-1,2,2-trichloroethane as a product of the process.

2. The process of claim 1 in which the antimony halide is antimony trichloride.

3. The process of claim 1 in which the antimony halide is antimony trifluoride.

4. A process for the production of 1,1-difluoro-1,2,2-trichloroethane which comprises reacting hydrogen fluoride with pentachloroethane in the presence of an antimony halide, said halide being selected from the group consisting of fluorine and chlorine, and between about 0.5 and about 5 weight percent of chlorine based on the weight of pentachloroethane at a temperature between about 110° C. and 140° C., venting the hydrogen chloride formed during the reaction and recovering 1,1-difluoro-1,2,2-trichloroethane as a product of the process.

5. A process for the production of 1,1-difluoro-1,2,2-trichloroethane which comprises reacting hydrogen fluoride with pentachloroethane in the presence of an antimony halide, said halide being selected from the group consisting of fluorine and chlorine, and between about 1 and about 2 weight percent of chlorine based on the weight of pentachloroethane at a temperature between about 110° C. and 140° C., venting the hydrogen chloride formed during the reaction and recovering 1,1-difluoro-1,2,2-trichloroethane as a product of the process.

References Cited in the file of this patent

UNITED STATES PATENTS

| 2,005,708 | Daudt et al. | June 18, 1935 |

FOREIGN PATENTS

| 378,324 | Great Britain | Aug. 11, 1932 |
| 1,069,872 | France | Feb. 17, 1954 |